United States Patent [19]

Nakazawa et al.

[11] Patent Number: 5,538,195
[45] Date of Patent: Jul. 23, 1996

[54] DEVICE FOR GRANULATING AND COATING AND BAFFLE DEVICE FOR SAME

[75] Inventors: Shinzo Nakazawa; Shoichi Moro, both of Ashikaga; Shuri Yamada; Masanori Ogawa, both of Tokyo, all of Japan

[73] Assignees: Tokyo Tanabe Company Limited; Freund Industrial Company Limited, both of Tokyo, Japan

[21] Appl. No.: 211,757

[22] PCT Filed: Oct. 21, 1992

[86] PCT No.: PCT/JP92/01370

§ 371 Date: Apr. 15, 1994

§ 102(e) Date: Apr. 15, 1994

[87] PCT Pub. No.: WO93/07963

PCT Pub. Date: Apr. 29, 1993

[30] Foreign Application Priority Data

Oct. 22, 1991 [JP] Japan ................................. 3-273738

[51] Int. Cl.⁶ ............................ B02C 17/00; A23G 3/26; B01F 5/04
[52] U.S. Cl. ................ 241/284; 118/19; 118/418; 366/56; 366/175.3; 241/172
[58] Field of Search ................... 34/110; 118/19, 118/20, 58, 303, 418; 366/56, 105, 234, 425, 222, 175; 241/284, 172

[56] References Cited

U.S. PATENT DOCUMENTS

| | | | |
|---|---|---|---|
| 3,874,092 | 4/1975 | Huttlin | 118/19 X |
| 4,129,666 | 12/1978 | Wizerkanink | 118/19 X |
| 5,050,528 | 9/1991 | Yamada et al. | 118/19 |
| 5,397,393 | 3/1995 | Tsujino et al. | 118/19 |

FOREIGN PATENT DOCUMENTS 1183626  12/1964  Germany ................. 118/19

*Primary Examiner*—Timothy V. Eley
*Attorney, Agent, or Firm*—McGlew and Tuttle

[57] ABSTRACT

The present invention relates to a granulating and coating technique, and more particularly to a technique wherein powder and granules are contained in a drum rotating about a substantially horizontal axis and the rotary drum is rotated for granulation of the granules and (or) coating. There is provided a rotary drum (1) for containing the powder and granules (M) and rotating about the substantially horizontal axis, and also provided a baffle member (12) continuously or intermittently rotating or swinging at the inside of the powder and granules (M) layer in the rotary drum (1). The baffle is turned in the granules, so that the raw materials for the powder and granules can be prevented from adhering to the baffle member and the rotary drum or from peeling off therefrom, thus obtaining products of uniform coating.

19 Claims, 9 Drawing Sheets

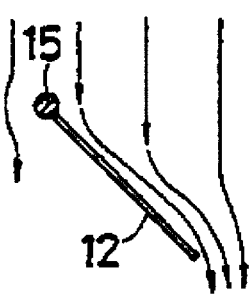
FIG. 3(a)
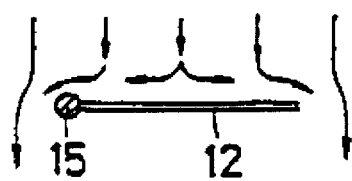
FIG. 3(b)
FIG. 3(d)
FIG. 3(e)
FIG. 3(c)
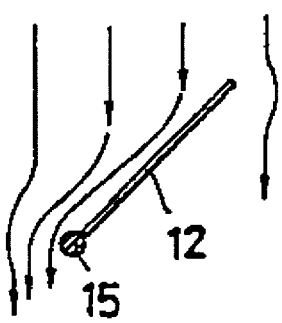
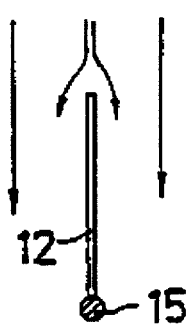
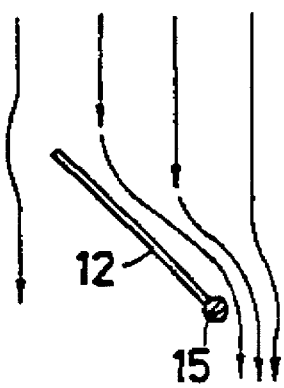
FIG. 3(f)
FIG. 3(g)
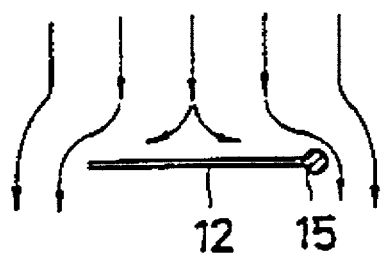
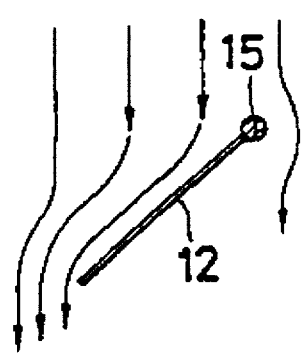

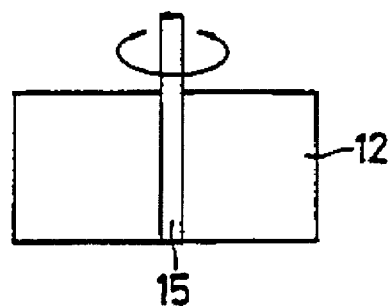
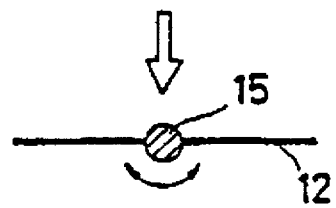
FIG. 8
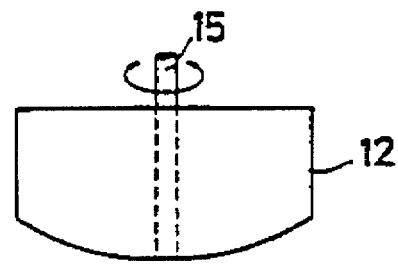
FIG. 9
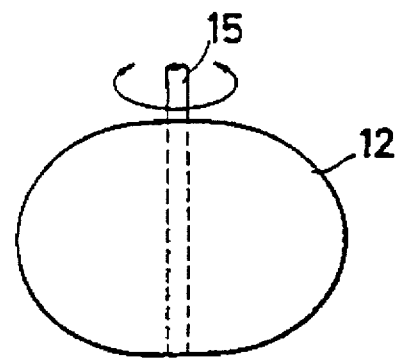

5,538,195

DEVICE FOR GRANULATING AND COATING AND BAFFLE DEVICE FOR SAME

FIELD OF THE INVENTION

The present invention relates to a granulating and coating technique, and more particularly to a technique wherein powder and granules are contained in a drum rotating about a substantially horizontal axis and the rotary drum is rotated for granulation of the powder and granules and (or) coating thereof.

BACKGROUND ART

Techniques for granulating and coating are know including such as granulating and coating various powder and granules including medicines, foods, synthetic chemical products, etc. by supplying and discharging gas such as hot air blown into and from a rotary drum (coating pan) while rotating the rotary drum around a horizontal axis.

In the technique described above, there is raised a technical problem of how to agitate and mix the powder and granules efficiently in the rotary drum in order to accomplish a desired granulating or coating operation efficiently and homogeneously. To solve this problem, it has been proposed to provide a baffle device fixed in the rotary drum for functioning as an obstacle to the flow of the granules etc. (See Japanese Patent No. Sho 52-10665 Gazette).

For the baffle device, there is proposed a baffle device in which its position is movable along with an axis or between the inside and outside of the granular layer.

In the former prior art described above, however, there is seen a phenomenon that the raw material of the powder and granules tends to adhere to the baffle device when processing of granulation and coating is carried out, then the material adhered is peeled off therefrom into the rotary drum, because the baffle device is installed on a fixed position. In such phenomenon, the adhered material detaches from the baffle device, then it can be a cause of defects such as unevenness in the thickness of the coated layer, oversized products so-called double tablets and irregular-shaped products which are a result of the adhesion of the material peeled off to the granulated products.

The later prior art described above provides an improved agitating operation accomplished by using the baffle device, however, the inventors herein found that it cannot solve all of the problems as described above and has defects due to the adhesion of powder and granules to the baffle device and the inner wall of the rotary drum and their peeling off therefrom as well.

OBJECTS OF THE INVENTION

In view of the problems as described above, it is an object of the present invention to provide a granulating and coating technique capable of obtaining products of uniform granulating and coating.

It is an another object of the present invention to provide a technique capable of eliminating the adhesion of the raw material of the powder and granules to the baffle device and their peeling off therefrom, and the problems associated thereto.

It is a further object of the present invention to provide a technique for making excellent agitation of the powder and granules.

It is a still further object of the present invention to provide a technique capable of improving the efficiency in the production of the granules or coated products.

Aforementioned and other objects and the novel advantageous features of the present invention will be clarified in the description of this specification with reference referring to the drawings appended.

DISCLOSURE OF THE INVENTION

In the scope of the invention disclosed in the present patent application, the representative embodiment thereof can be outlined as follows.

The granulating and coating method of the present invention achieves granulation and coating by using an apparatus for granulating and coating wherein material of powder and granules are contained in a rotary drum installed in said apparatus for granulating and coating, said rotary drum is rotated about a substantially horizontal axis therein, while rotating a baffle device at the inside of the layer of the powder and granules contained in the rotary drum.

The baffle apparatus for granulating and coating of the present invention is one to be used for the granulating and coating apparatus which is installed with a rotary drum for containing the powder and granules and rotating about a substantially horizontal axis, and contains a baffle means turning at the inside of the layer of the powder and granules in the rotary drum and a drive means for actuating the rotation of the said baffle means.

The granulating and coating apparatus of the present invention comprises said baffle apparatus installed thereto.

In the granulating and coating technique specified in the present invention, the problems primarily caused by the peeling off of the adhered materials as described above, can be solved by turning the baffle device at the inside of the layer of the powder and granules contained in the rotary drum to thereby prevent the adhesion of the raw materials of the powder and granules to the surface of the baffle device and the inner wall of the rotary drum.

By turning this baffle device in the rotary drum, it becomes possible to provide products of uniform granulating and coating.

In addition, the turning of the baffle device makes it possible to perform thorough agitation of the raw materials of the powder and granules.

BRIEF DESCRIPTION OF THE DRAWINGS

FIG. 3(a) to (g) are diagrams explaining in order the variation in the position to turn the baffle device and the flow of the powder and granules.

FIG. 5 to FIG. 22 are diagrams showing the other embodiments of the baffle device according to the present invention.

BEST MODE FOR CARRYING OUT THE INVENTION

Figure 1:
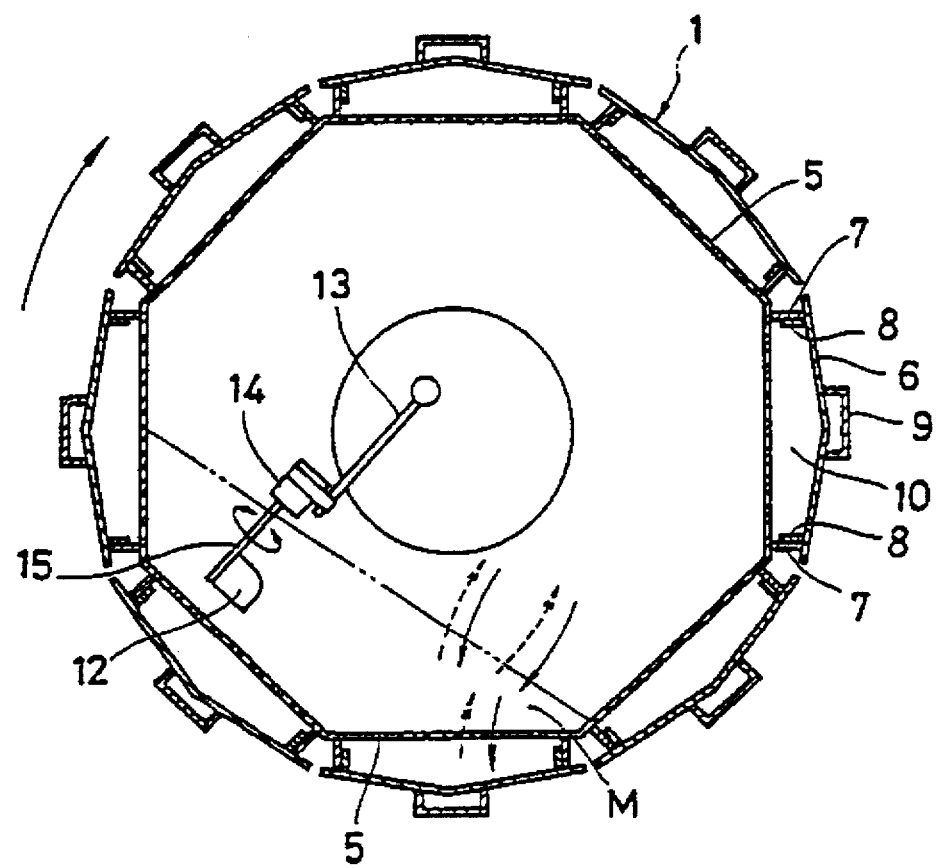
FIG. 1 is a sectional view of one embodiment of the granulating and coating apparatus according to the present invention.
Figure 2:
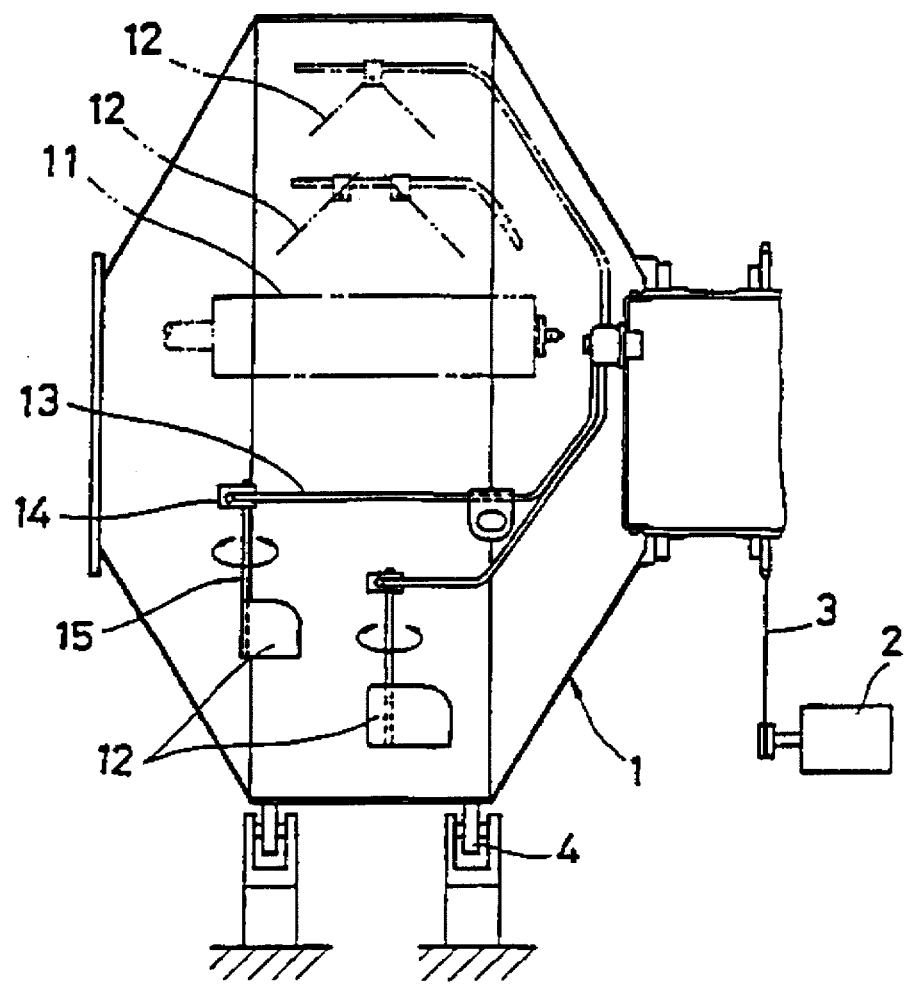
FIG. 2 is a general view showing the concept of the apparatus thereof.

Now the granulating and coating apparatus according to the present invention is described with referring to FIGS. 1 and 2. A rotary drum 1 for containing and rotating powder and granules M like powder or tablets, which are the objects to be granulated and/or coated, is supported on a rotary roller 4 so as to rotate about a horizontal axis by the actuation of a drive power 2 such as motor via a belt 3.

The rotary drum 1 of this embodiment is formed in an octagonal sectional structure as an example of the polygonal structures, which allows the prevention from slip of the powder and granules M in the rotary drum 1. In the fixed sites of each side of the octagonal rotary drum 1, there are provided a plurality of pores 5 made by means of punching, etc. The rotary drum 1 having the pores 5 can be constructed by firstly forming the pores 5 in a predetermined size of a plate, then connecting the plates to each other in an octagonal shape by means of welding, or welding eight pieces of the plates having the pores 5 to a frame.

On each of the sides of the octagonal rotary drum 1 having the pores 5, outer circumferential members 6, each of which can be separated and each of which is a hermetic jacket being individually detachable, are formed respectively to secure easy and sure cleaning of the outer circumference of the drum having the pores 5.

Each outer circumferential member 6 has a dimension corresponding to each side of the octagonal rotary drum 1, and it is allowed to be sealed to and peeled off from each side of the rotary drum 1 by holding it with a handle 9 in a manner to engage a first flange 7 fixed by welding to the outer side of the drum side and a second flange 8 fixed by welding to the inner side of the outer circumferential member 6. A space surrounded by the outer circumference of each side of the rotary drum 1, the inner side of the outer circumferential member 6 and the flanges 7 and 8, is formed to use as a space for exchanging gas 10.

There are also provided two ducts (not shown) for supplying or discharging gas, such as hot air blown and cooled gas, to the inside of the rotary drum 1. As shown with the solid line and broken line in FIG. 1, it is also possible to reverse the sage of the ducts from supply to the inside of the rotary drum 1 to discharge therefrom or vice versa.

Additionally, a nozzle unit 11 for supplying a coating solution or a binder solution is inserted in a direction along with the axis (horizontal direction) into the rotary drum 1.

In the rotary drum 1 of this embodiment according to the invention, there is provided a baffle member 12 (baffle means) being positioned in the layer of the powder and granules M. This baffle member 12 is to agitate the powder and granules M contained in the rotary drum 1 to thereby obtain products of uniform granulating and coating.

The baffle member 12 of the invention is supported by an arm 13 (a member to be installed) which is installed on the one longitudinal side of the rotary drum 1, and it is capable of turning continuously or intermittently in the layer of the powder and granules M.

For this purpose, the baffle member 12 is, for example, supported by the arm 13 via a power rotary drive 14 (drive means) such as an air-operative rotary actuator, wherein a rotary shaft 15 is constituted so as to be be rotated by the power rotary drive 14.

Therefore, the baffle device for granulating and coating specified in the present invention comprises the baffle member 12, the arm 13, the rotary drive means 14 and the rotary shaft 15 described above.

The baffle member 12 is installed in a vertical direction with respect to the moving direction of the powder and granules M in the rotary drum 1.

When the baffle member 12 is turned by the power rotary drive 14, it is turned within a constant speed and at an fixed angular range, for example, reciprocating in a range of more than 180 degrees if the rotary drive power 14 is a rotary actuator, while it is rotated at a constant speed and toward a certain direction if the power rotary drive power 14 is an electric motor.

The details of the operation for granulating and coating in this embodiment is now explained.

Firstly a certain amount of raw material of the powder and granules is placed in the rotary drum 1, then a predetermined coating solution is supplied from the nozzle unit 11 into the rotary drum 1 while rotating the rotary drum 1 by actuating the drive power 2 via the belt 3, and the gas, such as blown hot air or cooled gas, is supplied to the rotary drum 1 and discharged therefrom through the duct (not shown), if necessary.

By continuing this procedure, the powder and granules M in the rotary drum 1 are tumbled, thereby the desired granulating and coating operation is allowed to be carried out.

In this embodiment, and in the process described above, the baffle member 12 capable of turning in the rotary drum 1 is installed in the rotary drum so that the powder and granules M being under the processing receive optimal agitation and mixing with it, which makes the granulating and coating operation efficient and uniform. In addition thereto, the baffle member 12 turns in the rotary drum, so that the defective production due to the adhesion of the powder and granules M to the surface of the baffle member 12 and the inner wall of the rotary drum 1 and the peeling off of the adhered materials therefrom can be prevented according to this embodiment.

With reference to FIG. 3(a) to (g), the positioning of the baffle member 12 during turning and the flow of the powder and granules M in this embodiment are now explained.

In FIG. 3, the baffle member 12 is shown as a plate body of which one end is installed to the rotary shaft 15 to support itself, and the arrows in the figures represent the flow of the powder and granules M.

FIG. 3(a) shows a state of the baffle member 12 which is taking a position inclined 45 degrees anticlockwise with respect to the flow of the powder and granules. In this situation, the powder and granules M having moved toward the one side of the baffle member 12 flow from the rotary shaft 15 toward the free end of the baffle member 12 along with the incline thereof, while being agitated and mixed by the baffle member 12 (see FIG. 3(a)).

Then, as shown in FIG. 3(b), when the baffle member 12 rotates about 45 degrees anticlockwise more, it takes a right-angled position with respect to the direction of the flow of the powder and granules M. In this state, the flow of the powder and granules M is obstructed by the baffle member 12 and dispersed right and left along with the one side of the baffle member, thereby those powder and granules are agitated and mixed to the maximal extent by the baffle member 12 (see FIG. 3(b)).

When the baffle member 12 is further turned 45 degrees anticlockwise, the powder and granules M are obstructed by said side of the baffle member 12 and agitated, however, these flow from the free end of the baffle member 12 toward the direction for the rotary shaft 15 in contrary to the case of FIG. 3(a) (see FIG. 3(c)).

As shown in FIG. 3(d), when the baffle member 12 is still further turned 45 degrees anticlockwise, the direction of the baffle member 12 becomes substantially parallel to that of the flow of the powder and granules M. In this state, the flow of the powder and granules M is partly changed primarily at the site of the free end of the baffle member 12 and the powder and granules M mostly flow along both side of the baffle member—substantially in parallel or in contact therewith (see FIG. 3(d)).

As shown in FIG. 3(e), when the baffle member 12 is turned again 45 degrees anticlockwise, the flow of the powder and granules M is changed along with the reverse side of the baffle member 12 and they flow from the free end side toward the rotary shaft 15, thereby the powder and granules M are agitated and mixed (see FIG. 3e)).

When the baffle member 12 is further turned another 45 degrees anticlockwise, it faces the contrary side thereof to that of FIG. 3(b) toward the flow of the powder and granules M and takes a right-angled position with respect to said flow. In this state, the flow of the powder and granules M is obstructed by the baffle member 12, thereby the powder and granules M are agitated and mixed (see FIG. 3(f)).

As shown in FIG. 3(g), when the baffle member 12 is once more turned 45 degrees anticlockwise, it takes a position inclined 45 degrees clockwise with respect to the flow of the powder and granules M, then the powder and granules M flow from the rotary shaft 15 toward the free end of the baffle member along the incline thereof, while being agitated and mixed (see FIG. 3(g)).

Then, the baffle member 12 is turned clockwise to return from the position of FIG. 3(g) to that of FIG. 3(a), and it is swung between the position of FIG. 3(a) and that of FIG. 3(g) in the angle range of about 270 degrees.

As described hereinabove, the powder and granules M are agitated and mixed while the baffle member 12 swings in repetition between the positions of FIG. 3(a) to (g), thus allowing one to obtain products of uniform granulating and coating.

In addition, because of the turning of the baffle member 12 in this embodiment, the contact of the powder and granules M to the surface of the baffle member 12 and the contacting direction thereof is always changing, the powder and granules M neither adhere to the sides of the baffle member 12 nor the inner wall of the rotary drum 1, which have been seen in the fixed-type baffle member, and therefore, it prevents the production of defective products due to the dropping and the peeling off of such adhered materials.

Now, hereinbelow, the modifications of the baffle member 12 according to the present invention are described with reference to FIGS. 4 to 22.

Figure 4:
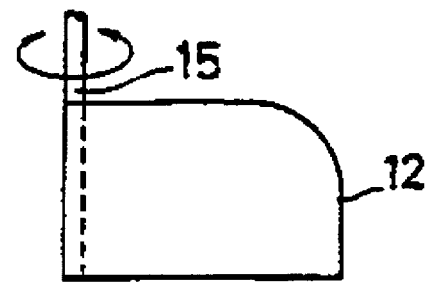
FIG. 4 is a front view showing one embodiment of the baffle device to be used in the present invention.

As partly shown in FIGS. 1 and 2, FIG. 4 illustrates an example wherein the baffle member 12, one of which corner is formed in a circular shape, is fixed to the rotary shaft 15 in a manner such that only one end of the baffle member 12 is held by the rotary shaft 15.

Figure 5:
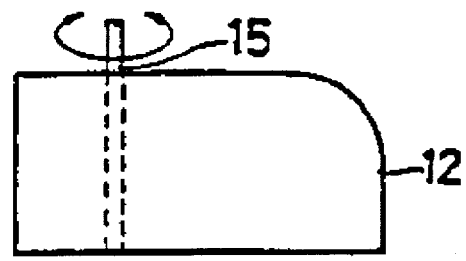

FIG. 5 is an example of the baffle member 12 wherein a slightly wide baffle member 12 is used and is fixed to the rotary shaft 15. The baffle 12 of FIG. 5 is longer than the one shown in FIG. 4. Additionally, the baffle member 12 of FIG. 4 is fixed to a rotary shaft 15 at the end of the baffle member. The baffle member 12 of FIG. 5 is fixed to the rotary shaft 15 with the rotary shaft at a position which is closer to the center of the baffle, namely at some location between the left end of the baffle 12 and the right end of the baffle 12.

Figure 6:
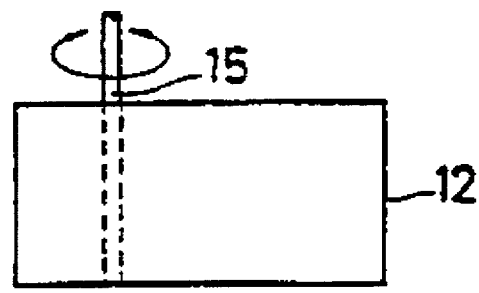

FIG. 6 is an example of the baffle member 12 wherein it is in a rectangular shape.

FIG. 7 is an example of the baffle member 12 wherein it is in a similar rectangular shape to that of FIG. 6 and is fixed to the rotary shaft 15 at the substantially central position of the longitudinal direction of the baffle member 12.

Figure 10:
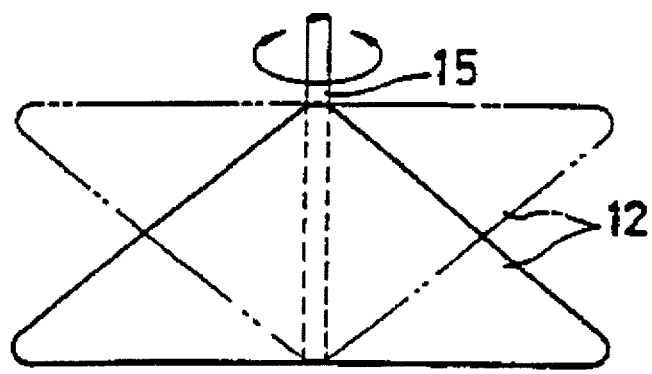

FIG. 8 shows an example of a baffle member 12 wherein the shape of the underside (bottom edge) is arcuate, preferably providing a substantially circular segment. FIG. 9 shows another example wherein the baffle member is substantially elliptic. FIG. 10 shows an example wherein the baffle member 12 is substantially triangular.

By turning the baffle member 12 of FIG. 10 upside down provides a reverse triangular shape, the upper layer of the powder and granules M can be agitated and mixed to a further extent, providing better performance in agitation and mixing thereof.

Figure 11:
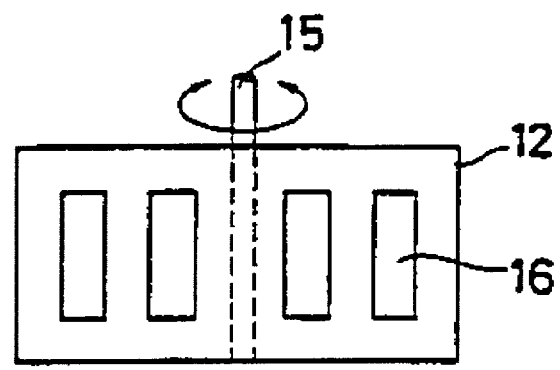

In the example of FIG. 11, four pores 16 (openings) are formed such that the openings pass through the baffle member 12. This provides improved agitation and provides an improved mixing of the powder and the granules M by allowing the powder and the granules M pass through the openings (pores) 16.

Figure 12:
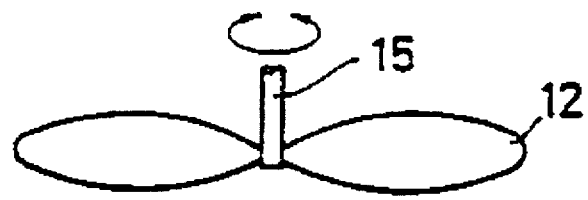

The baffle member 12 in FIG. 12 has a propeller structure.

Figure 13:
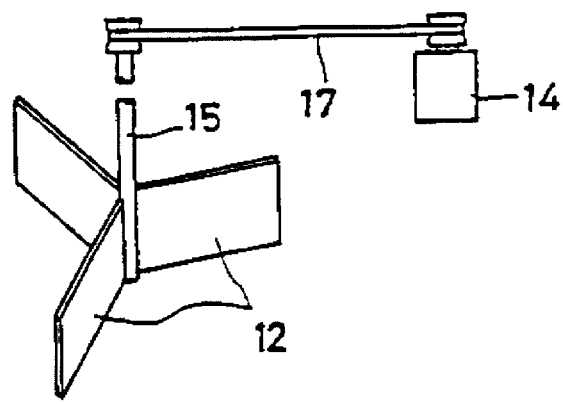

In an example as illustrated in FIG. 13, there is provided a structure wherein an electric motor is used as the rotary drive power 14 by which the rotary shaft 15 and the baffle member 12 are rotated toward a certain direction and at a constant speed continuously or intermittently via the belt 17. In FIG. 13, it is shown as an example wherein three plates are situated as the baffle member 12 at an angle of substantially 120 degrees to one another.

Figure 14A:
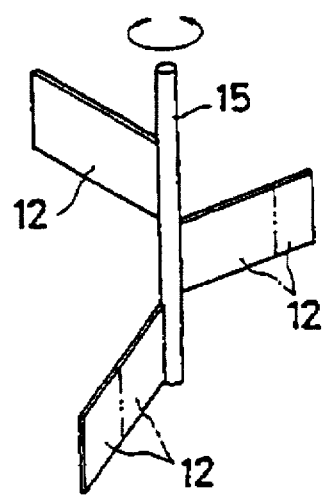
Figure 14B:
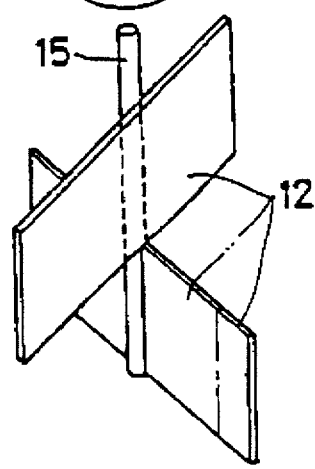

In an example as illustrated in FIG. 14(a), the baffle device is composed of three baffle members 12 in a rectangular plate shape, which are shifted to one another in a longitudinal direction of the rotary shaft 15 and form on angle of 120 degrees to one another. The example illustrated in FIG. 14(b) is a baffle device composed of two rectangular baffle members 12 which are fixed side by side along the longitudinal axis of the rotary shaft 15 and intersect at right angles to each other. In these examples, the structures of the baffle device is constituted so as to agitate and mix the upper, middle and lower layers of the powder and granules M, or the upper and lower layers thereof, simultaneously.

In the examples illustrated in FIG. 14(a) and (b), the upper baffle member 12 is made longer and the lower one is made shorter as shown with two-dotted chain lines. By using this type of the baffle device, it facilitates better agitation and mixing of the upper layer of the powder and granules M, thus providing improved products of granulating and coating.

FIGS. 15 to 19 are plan views of examples wherein non-plate structural bodies are employed as the baffle members 12.

Figure 15:
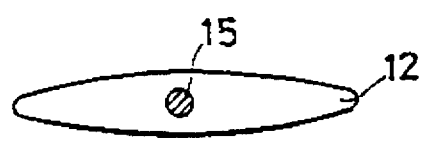
Figure 16:
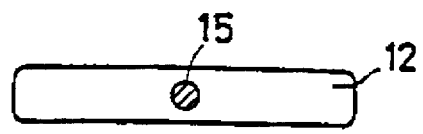
Figure 17:
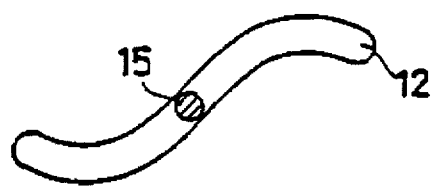
Figure 18:
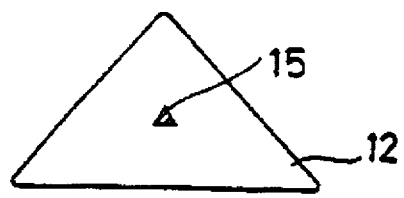
Figure 19:
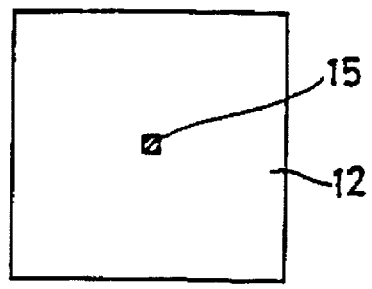

FIG. 15 shows a baffle member of which the central portion is thicker than the other portion, FIG. 16 shows one in which the whole member is made thick, FIG. 17 shows an S-shaped member, FIG. 18 is a triangular member in the view from plane direction, and FIG. 19 is square one in the same view.

Figure 20:
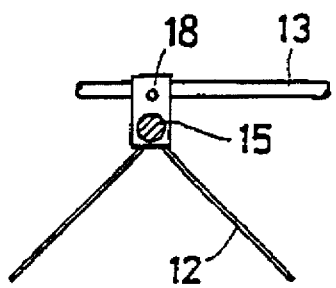

FIG. 20 is an example of the baffle device wherein the baffle member 12 is constituted with a plate being bent in a V-shape and is fixed to a slider 18 opposite to the arm 13.

Figure 21:
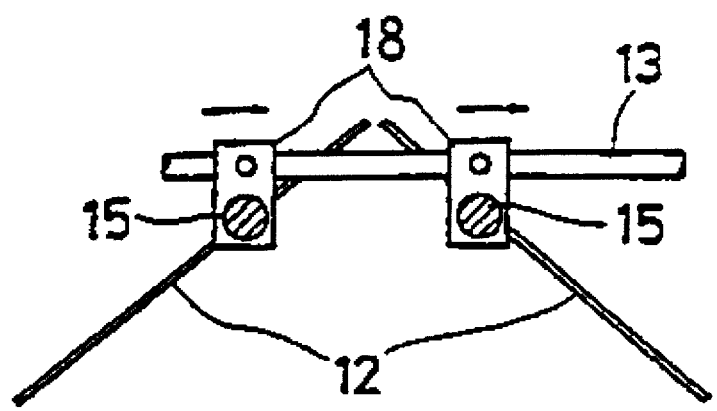

FIG. 21 is an example of the baffle device wherein two rectangular plates are fixed to the rotary shaft 15 to form the baffle members 12. In the plates oppose each other. The plates are positioned such that one end of the plates will be closer together at any point during rotation whereas the other ends of the plates are spaced apart with continued rotation resulting in the spaced apart ends being subsequently closer together etc. The baffle members 12 are movable respectively via the slider 18 along with the arm 13 to close and separate each other. In this example, therefore, the baffle members 12 are rotatable around the rotary shaft 15 and movable along with the arm 13 via slider 18, thereby allowing the position adjustment of the baffle members 12 for the agitation and mixing of the powder and granules M in a wide range.

Figure 22:
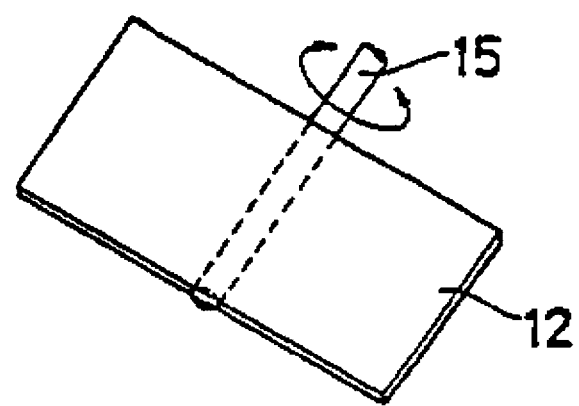

The example illustrated in FIG. 22 shows the baffle device wherein the rotary shaft 15 is installed in an inclined state, which is also included in the embodiment of the baffle device according to the present invention.

The present invention is described in detail based on the examples described hereinabove, however, the present invention should not be limited to the description in those examples and it will be apparent to those skilled in the art that various modifications and variations of the method and apparatus of the present invention which fall within the scope of the present invention can be made.

For example, the shape and size of the baffle member 12 and the structure of the arm 13 for installing the baffle member 12 are not limited to the ones described in the aforementioned examples.

And the sectional structure of the rotary drum 1 may be other polygonal shapes than an octagonal one, or even curved shapes (with rounded portions).

Further, the structure and manner for the attachment and detachment of the rotary drum 1 and the manner of the installation of the plate having pores 5 are not limited to the ones described in the aforementioned examples.

Further, it is also optional to replace the rotary drive power 14 from the air-operative type to oil-hydraulic type or motor-operative type as well as a piping system.

The baffle members 12 may be coated with fluorine resin or silicone resin, or may be made of engineering plastics.

The position of the baffle member 12 may be changed by setting its position at any position within a range from the position wherein the baffle member is entirely buried in the powder and granules M to a position wherein the baffle member 12 has no contact with powder and granules M.

The above provides the possibility of inserting the baffle member 12 only partially into the powder and granules M.

In the above description, the present invention is explained in connection with its use for the granulation and/or coating of medicines, foods and synthetic chemicals, however, it should not be limited to such use, and it can be widely utilized in the granulation and/or coating of other granules and the processing of granules, such as drying, mixing, etc.

INDUSTRIAL APPLICABILITY

The followings are the summarized advantageous effects obtainable by the representative embodiments of the present invention.

(1) By turning the baffle means at the inside of the layer of the powder and granules, the adhesion of the raw materials of the powder and granules to the baffle means and the inner wall of the rotary drum can be prevented, thereby the defects in coating due to the peeling off of the adhered materials can be prevented.

(2) Because of the advantageous effect mentioned in (1), the occurrence of oversized and irregular or abnormal-shaped products (those which are caused by the peeling off of the adhered materials) can be prevented.

(3) The turning of the baffle members provides homogeneous and ideal agitation of the powder and granules.

(4) Because of the advantageous effect mentioned in (3), the extensibility of the coating solution is improved, thereby the homogeneous coating can be readily made.

(5) Because of the advantageous effects mentioned in (3) and (4), the unevenness in the thickness of the coated layer can be eliminated, thereby coating products with uniform quality can be manufactured steadily.

(6) Because of the advantageous effects mentioned from (1) to (5), uniform products having no contamination of impurities can be obtained, therefore, it is very useful and significant in view of Good Manufacturing Practice (GMP), when it is applied for the manufacturing of medicines.

What is claimed is:

1. A device for granulating and coating, comprising:
    a rotary drum rotating about a substantially horizontal axis;
    powder and granules positioned within said rotary drum;
    a baffle means positioned in said rotary drum extending into said powder and granules; and
    drive unit means connected to said baffle means for rotating or swinging said baffle means either continuously or intermittently while maintaining said baffle means at least partially immersed in powder and granules.

2. Device according to claim 1, said drive unit means swings said baffle means at a constant speed within an angle range of at least 180°.

3. Device according to claim 1, wherein said baffle means includes a baffle member formed as a plate.

4. Device according to claim 3, wherein said plate has pores defining a passage through said plate.

5. Device according to claim 1, wherein said baffle means includes a non-plate baffle member.

6. Device according to claim 1, wherein said baffle means includes a plurality of baffle members.

7. Device according to claim 6, wherein said baffle members are installed side by side, said baffle members being shiftable with respect to one another in a longitudinal direction of a central drive axis.

8. Device according to claim 7, wherein said baffle members are installed one atop another with an upper baffle member being longer than a lower baffle member.

9. Device according to claim 1, wherein said rotary drum has a longitudinal axis and said baffle means may be installed at various angular positions with respect to said longitudinal axis of said rotary drum.

10. Device according to claim 9, wherein a plurality of baffle members are installed, the position of each baffle member being changeable with respect to said longitudinal axis of said rotary drum.

11. Device according to claim 1, wherein said baffle members are vertically installed with respect to a moving direction of powder and granules positioned within said rotary drum.

12. A device for granulating and coating, comprising:
    a rotary drum having a porous wall covered by an outer enclosure to form a gas flow space therebetween;
    powder and granules positioned within said rotary drum;
    baffle means positioned in said rotary drum for engaging said powder and said granules; and
    drive unit means including a rotary drive and a rotary shaft, said shaft being connected to said rotary drive for driving said shaft in rotation, said baffle means being connected to said rotary shaft.

13. A device according to claim 12, wherein said drive unit means causes said rotary shaft to reciprocate between a first rotary position and a second rotary position, an angle formed between first rotary position and said second rotary position being at least 180°.

14. A device according to claim 12, wherein said baffle means includes a baffle member which has a thickness dimension which is much less than a length and height dimension.

15. A device according to claim 12, wherein said baffle means includes a baffle member having openings defining passages through said baffle member.

16. A device according to claim 12, wherein said baffle means includes a baffle member with a thickness which is not much smaller than a height and length of the baffle member.

17. A device according to claim 12, wherein said baffle means includes a plurality of baffle members.

18. A device according to claim 12, wherein said baffle means includes a plurality of baffle members.

19. A device for granulating and coating, comprising:

a rotary drum having a porous wall covered by an outer enclosure to form a gas flow space therebetween;

powder and granules positioned within said rotary drum;

baffle means positioned in said rotary drum for engaging said powder and said granules said baffle means including a baffle member at least partially immersed in said powder and granules; and drive unit means including a rotary drive and a rotary shaft, said shaft being connected to said rotary drive for driving said shaft in rotation, said baffle member being connected to said rotary shaft, said shaft extending into said powder and granules whereby said shaft is rotated either partially or fully for either partial or full rotation of said baffle member about an axis of said shaft.

* * * * *